United States Patent [19]
Montagne

[11] 3,789,898
[45] Feb. 5, 1974

[54] TUBELESS TIRES

[75] Inventor: Jean Bernard Montagne, Cebazat, France

[73] Assignee: Compagnie Generale Des Establissements Michelin, raison sociale Michelin & Cie, Clermont-Ferrand, France

[22] Filed: Apr. 6, 1972

[21] Appl. No.: 241,739

[52] U.S. Cl............................................ 152/209 R
[51] Int. Cl............................................ B60c 11/06
[58] Field of Search................................ 152/209 R

[56] References Cited
UNITED STATES PATENTS 3,384,144   5/1960   Tiborcz.............................. 152/209
3,534,798   10/1970  Ravenhall........................... 152/209

FOREIGN PATENTS OR APPLICATIONS 638,842   3/1962   Canada................................ 152/209

Primary Examiner—James B. Marbert
Attorney, Agent, or Firm—Brumbaugh, Graves, Donohue & Raymond

[57] ABSTRACT

A tire having excellent road-holding and wear properties is further improved behaviorally by providing a central articulation zone or joint in the tread thereof.

3 Claims, 2 Drawing Figures

PATENTED FEB 5 1974  3,789,898

TUBELESS TIRES

The present invention relates to improvements in tires, which improvements concern more particularly the tread — new or recapped — of radial-carcass tires for highway vehicles of the heavy-duty type, such as trucks, buses, etc.

The tread of radial-carcass tires for heavy vehicles is generally cut into circumferential ribs of equal widths by means of circumferential zigzag grooves. In order to improve the wear and road-holding properties it is furthermore known, particularly from French Pat. No. 1,452,048, to employ the following measures:

a. The zigzag circumferential grooves are composed of two wide grooves closer to the central plane than to the edges of the tread and several narrow grooves which are sufficiently narrow to be closed in the contact ellipse.

b. The wide or narrow circumferential grooves have a depth substantially less than the thickness of the tread, at least in the case of a new tire. There is thus present between the nadir of the grooves and the underlying reinforcement a cushion of rubber which acts as dampener and protection.

c. The tread is relatively "flat." In other words, the meridian radius of curvature is greater than the longitudinal radius of curvature.

The truck tires which have thus been described have excellent road-holding and wear properties. On the other hand, they have the drawback of being sensitive to irregularities in the surface of the road, which may make driving relatively tiring, particularly in the case of deformations in the road surfacing.

The present invention is directed at improving the behavior of these tires while maintaining their wear and road-holding properties.

The tire for heavy-duty vehicles, in accordance with the invention, is of the radial-carcass type with tread reinforced by a tread reinforcement. The relatively flat tread is cut out over a fraction of its thickness by circumferential grooves. The tire is characterized by the fact that the tread has a central articulation or joint lying along a circumferential line at or adjacent the central plane of the tread more pronounced than along any other circumferential line distant from said plane and affecting substantially the entire thickness of the tread.

In accordance with a first embodiment, the central articulation or joint of the tread is obtained by an incision of negligible width which forms an extension of a central circumferential groove down to substantially the level of the tread reinforcement.

In accordance with a second embodiment, the central articulation or joint of the tread is produced by a central circumferential groove of customary width and is accentuated by the partitioning into two half plies of the protective ply or plies interposed between the tread and the tread reinforcement.

It has been found, without this having been foreseeable, that it was sufficient to cut the tread deeper along a line close to the central plane of the tread in order very substantially to improve the behavior of the tire and make driving more pleasant and less fatiguing. Moreover, the tire moves more easily over any difference in level between adjacent parts of the road and the shoulders without it being necessary to move onto same along a wide angle and therefore without incurring the risk of swerving.

The partitioning of the protective ply or plies into two half plies combined with a central groove produces a similar effect. It is known that by "protective ply" there is designated a ply in general of elastic metal cables the main role of which is to protect the reinforcement of the tire from cuts and punctures and that it is arranged between the tread and the tread reinforcement, formed, for instance, of three or four superimposed plies of nonelastic metal cords.

The present invention will be fully understood by reference to the accompanying drawings which show one embodiment thereof.

Figure 1:
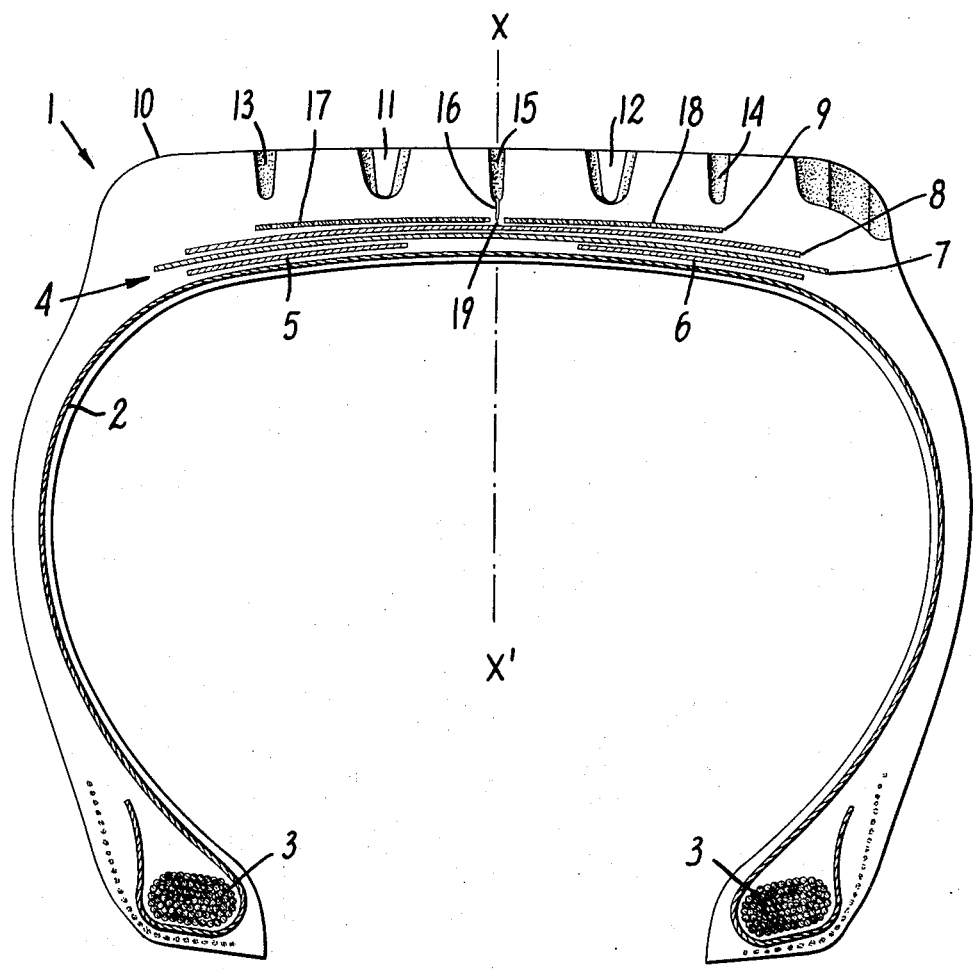
FIG. 1 is a radial section through a tubeless tire in accordance with the invention.
Figure 2:
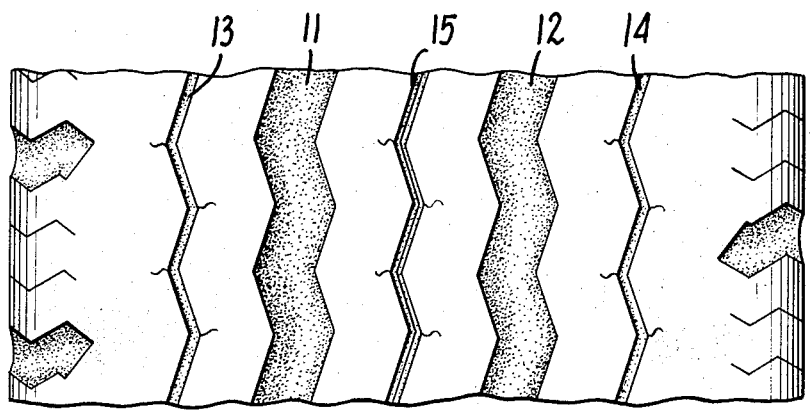
FIG. 2 shows in plan view a portion of the tread of the same tire.

In FIG. 1 a tire 1 as well as its main elements are shown in section. 2 is a carcass the cords of which, arranged in the radial planes, extend from bead-wire to bead-wire 3. A tread reinforcement 4 comprises in succession two marginal plies 5 and 6 the metal cables of which are arranged at an angle of 65° and two main plies 7 and 8 the metal cables of which form angles of 22° in one direction and the other.

The tread 10, as can be noted from the two figures, is divided by two wide grooves 11 and 12 which are relatively close to the central plane XX' and three narrow grooves 13, 14 and 15.

In accordance with the invention, as can be seen from FIG. 1, the narrow central groove 15 is extended by a cut 16 of negligible width and the zigzag course of which is the same as that of the groove 15.

Moreover, in accordance with the invention, between the tread and the tread reinforcement 4 composed of the plies 5 to 8 there is interposed a protective ply 9 the cords of which are parallel to those of the ply 8 but which is divided into two half plies 17 and 18 arranged side by side with a space 19 between them of negligible width.

As can be noted, the cut 16 and the division of the protective ply 9 into two half plies have the effect of permitting the formation of a zone of articulation of the tread adjacent or at the central plane XX'. This articulation or juncture has the effect of improving the behavior of the tire, particularly when it is used on the front wheels of a vehicle.

It goes without saying that one would not be going beyond the scope of the invention if one provided in the central zone of the tread not one but rather two narrow grooves 15 extended by incisions, or if one divided the protective ply 9 not into two elements but into three.

The essential feature is to locate the articulation or articulations of the tread in the central zone. Experience has shown, as a matter of fact, that when the narrow grooves 13 and 14 are extended by incisions similar to the incision 16, one does not obtain any substantial improvement in the behavior, while, on the other hand, one loses resistance to wear.

Of course, the invention is not limited to the case in which the central groove extended by an incision is a narrow groove. However, it is preferable to cut the bottom of a narrow groove rather than that of a wide groove.

What is claimed is:

1. A tire for heavy-duty vehicles of the radial-carcass type with tread reinforced by a tread reinforcement, the relatively flat tread of which is cut over a fraction of its thickness by circumferential grooves, characterized by the fact that the tread has a central articulation or joint lying along a circumferential line at or adjacent the central plane of the tread more pronounced than along any other circumferential line distant from said plane and affecting substantially the entire thickness of the tread, said central articulation or joint being obtained by at least one incision of negligible width.

2. The tire according to claim 1 wherein the central articulation or joint of the tread is obtained by at least one incision of negligible width forming an extension of a central circumferential groove down to substantially the level of the tread reinforcement.

3. The tire according to claim 1 wherein the central articulation or joint of the tread is accentuated by the partitioning into two half plies of the protective ply or plies interposed between the tread and the tread reinforcement.

* * * * *